United States Patent Office 2,833,646
Patented May 6, 1958

2,833,646

NICKEL BASE ALLOY GLASS MOLDING ELEMENTS AND METHOD OF MAKING SAME

Gerald L. Lee, Plainfield, N. J., assignor to The International Nickel Company, Inc., New York, N. Y., a corporation of Delaware No Drawing. Application June 20, 1955
Serial No. 516,759

7 Claims. (Cl. 75—170)

The present invention relates to an improved nickel-copper casting alloy having a high combination of properties, including good castability, resistance to the deleterious effects of corrosion and heat shock and, more particularly, to cast glass molding elements, i. e., glass molds and plungers, made from a special nickel-copper alloy and the process of producing the same.

Those skilled in the art know that the modern glass-molding machine is provided with glass molding elements comprising a plurality of molds into which the gob of hot, fluid glass is dropped and which are adapted to form the outer contour of the ware to be pressed from said hot glass and one or more plungers which act as a punch to partially or wholly form the inner contour of the ware to be pressed from said glass. The said glass molding elements cooperate to form the finished glassware and it is to the said elements that the present invention is directed.

It is well known that the molding of glass presents a very severe metallurgical problem. Thus, glass itself is a highly corrosive material which rapidly attacks most metals and alloys at the temperatures where glass is sufficiently fluid for successful molding, e. g., a temperature range of about 1900° F. to 2300° F. or even higher. In recent times, there has been a movement toward the use of fluorides and chlorides in the glass batch in order to provide a glass mix having either opacity or a lower fluid point, and these compounds have tended to make the corrosive nature of the fluid glass even more severe than has been the case in the working of leaded glasses. Another factor which makes for a very short life in glass molds and plungers is the thermal shock involved when the hot glass strikes the mold and/or plunger, which are usually water-cooled to reduce the operating temperature thereof. The severe nature of the service encountered in glass molds and/or plungers has been well recognized heretofore and strenuous efforts have been made to develop improved metallic materials which could be applied to glass mold service. It has been a particularly desired aim to provide cast glass molds which have satisfactory properties and service life but which would have the additional advantage of reduced initial cost associated with castings.

Although many attempts were made to overcome the foregoing difficulties and other difficulties, none, as far as I am aware, was entirely successful when carried into practice on an industrial scale.

It has now been discovered that when a nickel-copper alloy is treated in a special manner in the molten condition, the castability of the resulting novel alloy is greatly improved such that sound castings having fine grain and high resistance to corrosion and thermal shock can be produced therefrom, which castings are particularly adapted for use in glass molds and plungers.

It is an object of the present invention to provide a special improved nickel-copper casting alloy particularly adapted for use in the form of glass molds and plungers.

Another object of the invention is to provide a special nickel-copper casting alloy having an improved combination of castability and resistance to the effects of corrosion and thermal shock along with an extremely low glass adherence factor.

The invention also contemplates providing a method for producing a special nickel-copper alloy having improved castability which can be poured into sound castings have a fine grain and having high as-cast hardness to resist abrasion when used as a mold or plunger in glass pressing.

It is a further object of the invention to provide a special nickel-copper casting alloy having an inherent fine grain which is resistant to thermal cracking and corrosive attack, particularly at the grain boundaries thereof.

The invention further contemplates providing a method for molding glass articles having superior surface quality by molding the glass in cast molds made of a special nickel-copper alloy having the characteristic that a highly resistant, dense glaze forms upon the working face thereof, particularly in working with soda-lime glass.

Other objects and advantages will become apparent from the following description.

Generally speaking, the present invention involves a special nickel-copper casting alloy containing about 20% to about 40% copper, about 0.5% to about 17% aluminum, about 0.01% to about 0.5% titanium, about 0.03% to about 0.5% boron, about 0.2% to about 1.5% silicon, about 0.5% to about 2.5% manganese, carbon up to about 0.2%, about 0.02% to about 0.1% magnesium, and the balance essentially nickel, with the nickel content being about 50% to about 70%. All percentages of ingredients given herein are by weight.

It is preferred the special nickel-copper alloy contemplated in accordance with the invention contain about 28% to about 30% copper, about 0.3% to about 0.4% titanium, about 3% to about 5.5% aluminum, about 0.06% to about 0.1% boron, about 0.1% to about 0.15% carbon, about 0.8% to about 1.2% silicon, about 0.5% to about 1.2% manganese, about 0.03% to 0.06% magnesium, and the balance essentially nickel with the nickel content being about 62% to about 67%.

The special method contemplated in accordance with the present invention comprises establishing a bath containing between about 20% and about 45% copper, with the balance essentially nickel; oxidizing the bath, for example, by an addition of about 0.25% to 0.35% nickel oxide to remove oxidizable impurities; deoxidizing the bath with, for example, about 0.25% to about 0.5% of silicon; adding the required amount of manganese, usually at least about 0.5% manganese; carburizing the bath with, for example, an addition of about 0.1% to about 0.2% of carbon; thereafter adding about half the aluminum required to give the desired final aluminum content, preferably about 3.5% to about 5.5% aluminum; adding the titanium required to give the desired final titanium content in the castings, preferably about 0.3% to about 0.4% titanium; then adding the remainder of the aluminum to give the desired final aluminum content in the castings which preferably is about 3.5% to about 5.5%; adding the desired amount of boron, preferably about 0.06% to about 0.1% boron; adding at least about 0.05% magnesium along with or after said boron addition; and then casting metal from the bath. It is important that the boron addition be made subsequent to the last aluminum addition in order to provide proper fluidity and to clear up films formed on the molten metal.

The boron content in the special casting alloy contemplated in accordance with the invention is important and should not be less than about 0.03% as otherwise grain boundary cracking will occur when cast molds produced according to the invention are employed for hot pressing of glass. The boron content should not exceed about 0.5% as otherwise hot tearing occurs during cooling of the castings. The aluminum content in combination with the other ingredients and particularly in cooperation with the boron content is also highly important and should not be less than about 0.5% as otherwise the alloy does not develop the corrosion resistance and low glass adherence at high temperature required for glass mold service. The aluminum content should not exceed about 17% as the alloys then become quite brittle. With aluminum in the higher part of the range, it is preferable that the boron also be in the higher part of the range. The titanium content, in combination with the other ingredients, contributes importantly to the improved combination of castability, mechanical and physical properties developed in the special casting alloy contemplated in accordance with the present invention and should not be less than about 0.01% as otherwise castings become porous. The titanium content should not exceed about 0.5% as the melt becomes too sluggish to pour and to fill the mold cavity completely in producing castings. The silicon content likewise is important in combination with the other ingredients and should not be less than about 0.2%. The silicon content should not exceed about 1.5% as otherwise free silicides appear that tend to cause grain boundary cracking under thermal shock. The required amounts of manganese, in combination with the silicon, provide degasification and castability. The copper content of the special alloy is likewise important and should be maintained within the range of about 20% to 40% in order to provide corrosion and thermal shock resistance and good castability in the melt. The carbon content, in combination with the other required constituents, particularly aluminum and titanium, constitutes matrix hardening and control of volumetric shrinkage but should not exceed about 0.2% to avoid the occurrence of graphite.

Alloys produced in accordance with the invention may also contain up to about 2.5% iron, up to about 1% cobalt, and minor amounts of impurities and incidental elements such as sulfur, phosphorus, chromium, etc., introduced from the raw materials employed, from the melting equipment, etc., as these elements in minor amounts do not affect the basic and novel characteristics of the alloy.

It has been found that certain minor ingredients not usually found in alloys of the general type contemplated herewith should be avoided or should be present only in very small amounts. These elements include sulfur, lead, tin, antimony, selenium, tellurium, cadmium, bismuth and silver.

In order to give those skilled in the art a better understanding of the invention, the following illustrative example is given:

A bath containing nickel and copper in the approximate ratio of 2 parts of nickel for each part of copper was established and brought to temperature. The metal was oxidized with an addition of about 0.3% of nickel oxide. The metal was then deoxidized with an addition of about 0.25% silicon, after which a carbon addition of about 0.1% was made. The manganese and silicon contents were then adjusted to about 1% each. About 3% of aluminum was then added, followed by an addition of about 0.3% titanium. Another aluminum addition of about 3% was made, and the bath was treated with about 0.05% magnesium and sufficient boron to yield about 0.07% boron in castings made from the bath. The temperature of the bath was adjusted to about 2550° F. and metal from the bath was cast into molds, including a chill mold, to produce glass mold castings. Upon analysis, the metal was found to contain about 29% copper, about 1% silicon, about 0.1% carbon, about 0.33% titanium, about 5.7% aluminum, about 0.05% magnesium, about 0.07% boron, about 1% manganese, and the balance essentially nickel. The chill-cast glass mold casting was essentially disc-shaped and was adapted to produce round panels for television purposes. The casting was finished by machining and polishing and was found to have a sound structure with a fine grain size of about 0.75 mm. to 1.13 mm. The cast mold was then subjected to test in molding round glass panels from fluosilicate glass having a gob drop temperature of about 2300° F. and a drop rate of about 60 drops per hour. The mold was operated until the glass panels coming therefrom showed a haze resulting from deterioration by corrosion of the mold surface. During operation, the mold attained a temperature of about 1450° F. About 500 satisfactory glass panels were produced from the cast mold (which was not plated), whereas the regular chromium-plated production mold used under these conditions gave about 400 satisfactory panels between platings. Cast glass molds and plungers made of the alloy are found to give very satisfactory service in molding soda-lime glass. These castings are observed to develop a firmly-adherent, highly-refractory, lustrous oxide coating or glaze on the working surfaces thereof. Such cast molds and plungers are so improved in finish during service in molding soda-lime glass that repolishing is rendered almost unnecessary. Wear from abrasion about the necks of the plungers or breakage of the parts becomes about the only cause for replacement.

Similar molds and plungers were sand cast from an alloy containing about 28.6% copper, about 0.13% carbon, about 0.37% titanium, about 3.43% aluminum, about 0.05% magnesium, about 0.07% boron, about 1.4% silicon, about 1.2% manganese, about 0.7% iron and the balance essentially nickel. When used in molding fluosilicate glass television panels, the sand cast components were found to produce about 400 satisfactory panels. The molds had a hardness of about 282 Brinell and a grain size of about 0.75 mm. The following table contains the compositions of other satisfactory alloys within the scope of the invention:

| Alloy | Percent Cu | Percent Ti | Percent Al | Percent B | Percent Si | Percent C | Percent Mg | Percent Ni |
|---|---|---|---|---|---|---|---|---|
| 3 | 19.8 | 0.012 | 0.6 | 0.475 | 0.2 | 0.013 | 0.1 | Bal. |
| 4 | 39.8 | 0.3 | 5.0 | 0.1 | 0.7 | 0.12 | 0.07 | Bal. |
| 5 | 27.1 | 0.05 | 16.5 | 0.48 | 0.25 | 0.02 | 0.05 | Bal. |

Sand castings produced from the alloys in the foregoing table exhibited satisfactory soundness, freedom from laps and folds, and freedom from cracks.

Components made in accordance with the invention are highly resistant to the corrosive effects of molten glasses containing fluorides and chlorides. Such components resist adhesion or sticking of molten glass at gob drop temperatures up to about 2350° F. and mold temperatures up to about 1550° F. The metal is highly resistant to cracking due to thermal shock and has high mechanical properties which enable the cast components to resist high pressures such as are encountered in molding molten glass.

It has been found that the special nickel-copper casting alloy containing special amounts of boron contemplated in accordance with the invention may satisfactorily be cast in either sand or chill molds. The castings are characterized by a fine inherent grain size and by freedom from laps and folds. The microstructure developed in the castings is found to provide a dark etching matrix with some finely-divided beta phase. The grain boundaries resist etching attack and, in service, resist preferential corrosive attack thereon and also resist grain boundary cracking from thermal shock.

It has also been found that the special casting alloy contemplated in accordance with the present invention is also adapted for the production of cast dies useful in the die casting of non-ferrous metals, for example, aluminum-bronze. In one instance, cast dies were made from a composition containing about 29% copper, about 1% silicon, about 3.75% aluminum, about 0.03% boron, about 0.5% iron, about 1% manganese, about 0.1% carbon, about 0.5% titanium, about 0.05% magnesium, with the balance essentially nickel. These dies were employed in the die casting of aluminum-bronze and it was found that about 3500 castings were produced from the dies while other die materials employed for the same purpose yielded only about 300 to 500 pieces per die.

Alloy castings contemplated in accordance with the invention have typical mechanical properties as shown in the following table:

| Condition | As-Cast |
| --- | --- |
| Tensile Strength (p. s. i.) | 85–105,000 |
| Yield Strength (p. s. i.) (0.5% extension) | 60–80,000 |
| Percent Elongation in 2 inches | 5–10 |

Castings produced in accordance with the invention may be machined and ground using regular production machine tools. Preferably, carbide cutting tools are employed. Machined and/or ground castings present a smooth surface of high quality and this property of alloys produced in accordance with the invention is highly desirable in glass mold applications. This property permits repolishing of molds and plungers repeatedly until the parts go out of size. Parts made from the alloy of the invention can be made as much as ⅜ inch oversize to allow for machining and repolishing.

Regular production melting units may be employed in producing the special boron-containing castings described herein. Thus, either direct or indirect electric arc furnaces, the induction furnace or oil- or gas-fired furnaces may be employed to produce the alloy.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An alloy having improved resistance to thermal shock and the corrosive effects of molten glass and comprising about 20% to 40% copper, about 0.5% to 17% aluminum, about 0.01% to 0.5% titanium, about 0.03% to 0.5% boron, about 0.2% to 1.5% silicon, carbon up to about 0.2%, about 0.02% to about 0.1% magnesium, about 0.5% to about 2.5% manganese and the balance essentially nickel.

2. A cast glass molding element comprising about 28% to 30% copper, about 0.3% to 0.4% titanium, about 3% to about 5.5% aluminum, about 0.06% to 0.1% boron, about 0.1% to 0.15% carbon, about 0.8% to about 1.2% silicon, about 0.03% to 0.6% magnesium, about 0.5% to about 1.2% manganese and the balance essentially nickel.

3. A cast glass molding element comprising about 20% to 40% copper, about 0.5% to 17% aluminum, about 0.01% to 0.5% titanium, about 0.03% to 0.5% boron, about 0.2% to 1.5% silicon, carbon up to about 0.2%, about 0.02% to about 0.1% magnesium, about 0.5% to about 2.5% manganese and the balance essentially nickel.

4. The method for producing sound, thermal shock-resistant and corrosion-resistant cast glass molding elements which comprises establishing a molten bath containing copper and the balance essentially nickel oxidizing the bath with an addition of about 0.25% to 0.35% of nickel oxide, deoxidizing the bath with at least about 0.25% silicon and at least about 0.5% manganese, carburizing the bath with about 0.1% to 0.2% carbon, then adding about half the aluminum required to give an aluminum content of about 3.5% to 5.5%, then adding titanium in an amount to give a titanium content of about 0.3% to 0.4%, adding the remainder of the aluminum to give an aluminum content of about 3.5% to 5.5%, then adding boron to give a boron content of about 0.06% to 0.1%, adding at least about 0.05% magnesium at a time not preceding said boron addition and casting metal from said bath to provide castings of glass molding elements containing about 28% to 30% copper, about 0.3% to 0.4% titanium, about 3% to about 5.5% aluminum, about 0.06% to 0.1% boron, about 0.1% to 0.15% carbon, about 0.8% to about 1.2% silicon, about 0.03% to 0.06% magnesium, about 0.5% to about 1.2% manganese and the balance essentially nickel.

5. The method for producing sound, thermal shock-resistant and corrosion-resistant cast glass molding elements which comprises establishing a molten bath containing copper and the balance essentially nickel, oxidizing the bath with an addition of about 0.25% to 0.35% nickel oxide, deoxidizing the bath with an addition of at least about 0.2% silicon and at least about 0.5% manganese, carburizing the bath with up to about 0.2% carbon, then adding half the aluminum required to provide an aluminum content of about 0.5% to 17%, then adding titanium to give a titanium content of about 0.01% to about 0.5%, adding the remainder of the aluminum required to give an aluminum content of about 0.5% to 17%, thereafter adding boron to give a boron content of about 0.03% to 0.5%, adding magnesium to give a magnesium content of about 0.02% to 0.1% at a time not preceding said boron addition and casting metal from said bath to provide castings of glass molding elements containing about 20% to 40% copper, about 0.5% to 17% aluminum, about 0.01% to 0.5% titanium, about 0.03% to 0.5% boron, about 0.2% to 1.5% silicon, carbon up to about 0.2%, about 0.02% to about 0.1% magnesium, about 0.5% to about 2.5% manganese and the balance essentially nickel.

6. A cast molding element comprising about 20% to 40% copper, about 0.5% to 17% aluminum, about 0.01% to 0.5% titanium, about 0.03% to 0.5% boron, about 0.2% to 1.5% silicon, carbon up to about 0.2%, about 0.02% to about 0.1% magnesium, about 0.5% to about 2.5% manganese and the balance essentially nickel.

7. A method of producing molding elements which comprises establishing a molten bath of copper and the balance essentially nickel, oxidizing the bath with an addition of nickel oxide, deoxidizing the bath with an addition of at least about 0.2% silicon, carburizing the bath with up to about 0.2% carbon and making any necessary additions to provide a manganese content of about 0.5% to about 2.5% and a silicon content of about 0.2% to 1.5% in the product, then adding half the aluminum required to provide an aluminum content of about 0.5% to 17%, thereafter adding titanium to give a titanium content of about 0.01% to about 0.5%, adding the remainder of the aluminum required to give an aluminum content of about 0.5% to 17%, thereafter adding boron to give a boron content of about 0.03% to 0.5%, adding magnesium at a time not substantially preceding said boron addition to give a magnesium content of about 0.02% to 0.1% and casting metal from said bath to provide castings of molding elements containing about 20% to 40% copper, about 0.5% to 17% aluminum, about 0.01% to 0.5% titanium, about 0.03% to 0.5% boron, about 0.2% to 1.5% silicon, carbon up to about 0.2%, about 0.02% to about 0.1% magnesium, about 0.5% to about 2.5% manganese and the balance essentially nickel.

References Cited in the file of this patent

UNITED STATES PATENTS

| | | |
| --- | --- | --- |
| 1,059,709 | Byrnes | Apr. 22, 1913 |
| 1,115,238 | Parr | Oct. 27, 1914 |
| 2,048,163 | Pilling et al. | July 21, 1936 |
| 2,150,094 | Bieber | Mar. 7, 1939 |

FOREIGN PATENTS

| | | |
| --- | --- | --- |
| 140,756 | Great Britain | Jan. 20, 1921 |